United States Patent [19]
Imai et al.

[11] Patent Number: 5,165,716
[45] Date of Patent: * Nov. 24, 1992

[54] AIRBAG RESTRAINT SYSTEM

[75] Inventors: Hiroshi Imai; Fumio Miyauchi, all of Kanagawa, Japan

[73] Assignee: Ikeda Bussan Co., Ltd., Ayase, Japan

[ * ] Notice: The portion of the term of this patent subsequent to Jul. 23, 2008 has been disclaimed.

[21] Appl. No.: 619,348

[22] Filed: Nov. 29, 1990

[30] Foreign Application Priority Data

Dec. 27, 1989 [JP] Japan .................. 1-339385

[51] Int. Cl.⁵ ............................. B60R 21/16
[52] U.S. Cl. ................... 280/730; 280/743
[58] Field of Search ........... 280/728, 743, 730, 731, 280/732

[56] References Cited

U.S. PATENT DOCUMENTS

| | | | |
|---|---|---|---|
| 4,921,735 | 5/1990 | Bloch | 280/743 |
| 4,966,389 | 10/1990 | Takada | 280/743 |
| 5,033,771 | 7/1991 | Miyauchi | 280/728 |

FOREIGN PATENT DOCUMENTS

| | | | |
|---|---|---|---|
| 2552815 | 5/1977 | Fed. Rep. of Germany | 280/743 |
| 52-5126 | 1/1977 | Japan | 280/731 |
| 52-43233 | 4/1977 | Japan | 280/728 |
| 54-69543 | 5/1979 | Japan | |
| 56-43890 | 10/1981 | Japan | |
| 2-74439 | 3/1990 | Japan | 280/728 |

Primary Examiner—Karin L. Tyson
Attorney, Agent, or Firm—Foley & Lardner

[57] ABSTRACT

An airbag restraint system for protecting a vehicle passenger in the event of a vehicle serious collision. The airbag restraint system includes an airbag which is adapted to inflate upon being supplied with gas from a gas generator. The airbag includes a bag-shaped section which is constituted of generally circular rear and front side sheet members which are joined together at their peripheral portions. A plurality of suspension belts are disposed inside the bag-shaped section. Each suspension belt is secured through rear and front belt catch members to the rear and front side sheet members. Each belt catch member is sewed to each sheet member, forming a sewed section which extends linearly and has a straightly extending portion generally perpendicular to a lengthwise direction of each suspension belt. The straightly extending portion of the sewed section is in a so-called bias state relative to the directions of the woven cloth grains of the sheet member.

19 Claims, 2 Drawing Sheets

AIRBAG RESTRAINT SYSTEM

BACKGROUND OF THE INVENTION

1. Field of the Invention

This invention relates to improvements in an airbag restraint system for protecting a vehicle passenger in a vehicle collision or the like, and more particularly to an airbag which is provided thereinside with suspension belts to prevent the airbag from inflating generally in one direction upon being supplied with gas from a gas generator.

2. Description of the Prior Art

Hitherto a variety of airbag restraint systems for automotive vehicles have been proposed and put into practical use in order to protect a vehicle passenger in the event of a vehicle collision or the like. Such airbag restraint systems are disclosed, for example, in Japanese Patent Publication No. 56-43890 and Japanese Utility Model Provisional Publication No. 54-69543.

The airbag restraint systems are usually arranged as set forth below. The airbag restraint system includes an airbag which momentarily inflates upon being filled with gas from a gas generator in the event of a vehicle collision or the like. The airbag is constituted of front and rear side sheet members which are formed of cloth material. The front and rear side sheet members are sewed at their peripheral portions with each other thereby to be formed into the bag-shape. The rear side sheet member is formed at its central part with a gas inlet through which the gas from the gas generator is supplied into the airbag.

Additionally, the airbag is provided thereinside with a plurality of suspension belts for the purpose of preventing the airbag from inflating to project generally in one direction or toward a vehicle passenger during inflation of the airbag upon being supplied with the gas. Each suspension belt is sewed at its front end section to a front belt catch member which is in turn sewed to the front side sheet member. The rear end section of the suspension belt is sewed to a rear belt catch member which is in turn sewed to the rear side sheet member. The rear side sheet member together with the rear belt catch member is put and tightly secured between a retainer and a base plate which is fixed to an instrument panel or the like in the vehicle.

However, drawbacks have been encountered in such a conventional airbag restraint system, as discussed hereinafter with reference to FIG. 7 of the drawings of the present application. As shown in FIG. 7, the rear end section 1a of each suspension belt 1 is sewed to the rear belt catch member 2 in such a manner that the lengthwise direction of the suspension belt end section 1a is parallel with the direction of a vertical grain of a woven cloth forming part of the rear side sheet member 3. It will be understood that there is a possibility that the rear side sheet member 3 is torn along a sewed section 4 through which the rear belt catch member 2 is sewed to the rear side sheet member 3, when a high tension or impact load is momentarily applied to each suspension belt 1. This considerably lowers a strength in pressure proof of the rear side sheet member 3, thereby causing the rear belt catch member 2 to be torn from the rear side sheet member 3. As a result, the airbag will strike against the vehicle passenger, thus lowering the safety of the conventional airbag restraint system.

SUMMARY OF THE INVENTION

An object of the present invention is to provide an improved airbag restraint system including an airbag which is high in pressure proof strength and reliable in safety.

Another object of the present invention is to provide an improved airbag restraint system including an airbag which is prevented from directionally inflating toward a vehicle passenger in the event of a vehicle collision, while being prevented from being torn.

A further object of the present invention is to provide an improved airbag restraint system including an airbag provided thereinside with suspension belts which are secured through a belt catch member to a sheet material of the airbag, in which the sheet material of the airbag is prevented from being torn even when a high tension or impact load is applied to each suspension belt, protecting the belt catch member from being torn apart from the airbag sheet material.

An airbag restraint system of the present invention is comprised of an airbag which is fluidly connected with a gas generator and adapted to be supplied with gas from the gas generator. The airbag includes a bag-shaped section which includes a rear side sheet member formed with a central opening through which gas is supplied into the bag-shaped section from the gas generator. A front side sheet member is joined with the rear side sheet member at an outer peripheral portion to define a joining line between the rear and front side sheet members. Each of the rear and front side sheet members includes a woven cloth. The directions of the corresponding grains of the woven cloths of the rear and front side sheet members cross each other at a first predetermined angle except for about 90° at the joining line. Rear and front belt catch members are sewed respectively to the rear and front side sheet members at their inner surfaces. A plurality of suspension belts are disposed inside the bag-shaped section. Each suspension belt has rear and front end sections which are sewed respectively to the rear and front belt catch members. A lengthwise direction of each suspension belt crosses each of the directions of the woven cloth grains of the rear and front side sheet members at a second predetermined angle except for about 90°.

Accordingly, by virtue of the fact that each suspension belt is fixed through the rear and front belt catch members to the rear and front side sheet members in a so-called bias state, even when a high tension or impact load is applied to each suspension belt upon momentary inflation of the airbag, the rear and front side sheet members are effectively prevented from tearing along a sewed section through which each belt catch member and each sheet member are sewed to each other, thereby improving a pressure proof strength of the rear and front side sheet members. This protects the belt catch members from being torn apart from the inner surface of the rear and front side sheet members, thus omitting the possibility that the airbag strikes against the vehicle passenger.

BRIEF DESCRIPTION OF THE DRAWINGS

In the drawings, the same reference numerals designate the same elements and parts throughout all the figures, in which.

Figure 1:
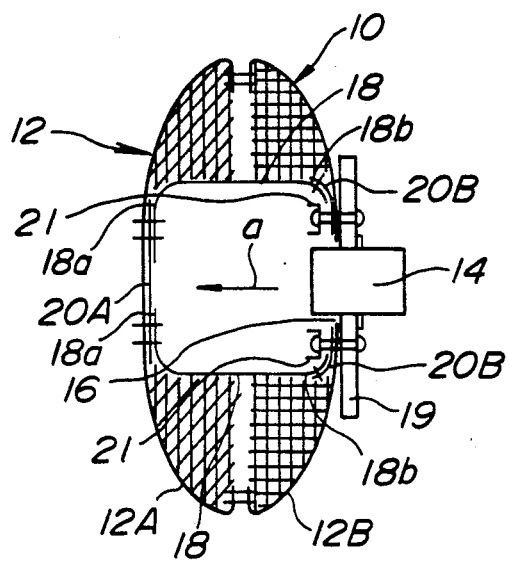
FIG. 1 is a schematic sectional view of an airbag of an embodiment of an airbag restraint system in accordance with the present invention, with the covers of the sheet members being removed to show the orientation of the woven cloth.

In the drawing figures, the covering layers of various elements of the system have been broken away to show the orientation of the woven cloth forming such elements.

DETAILED DESCRIPTION OF THE INVENTION

Referring now to FIGS. 1 to 4, there is shown an embodiment of an airbag restraint system in accordance with the present invention. The airbag restraint system of this embodiment is for an automotive vehicle and comprises an airbag 10. The airbag 10 is designed to momentarily inflate in the event of a vehicle collision in order to provide a soft cushion for a vehicle passenger. The inflation of the airbag 10 is carried out when the airbag 10 is supplied with gas generated by a gas generator 14. The gas generator 14 is arranged to generate gas to be supplied into the airbag 10 in the event of a vehicle collision.

The airbag 10 includes a bag-shaped section 12 which is constituted of front and rear side sheet or cloth members 12A, 12B which are generally circular. Each of the front and rear side sheet members 12A, 12B is formed of a woven cloth or the like which is coated with a flame-resistant synthetic resin layer. The outer peripheral portions of the front and rear side sheet members 12A, 12B are sewed to each other to be formed bag-shaped as clearly shown in FIG. 4. In this embodiment, the directions of the corresponding (vertical and horizontal) grains of the woven cloths of the front and rear side sheet members 12A, 12B cross each other at a predetermined angle ranging from 20° to 30° at a joining line L (in FIG. 4) at which the front and rear side sheets 12A, 12B are joined with each other. More specifically, the directions of the warp yarns of the woven cloths of the front and rear side sheet members 12A, 12B cross each other at the predetermined angle of 20° to 30° at the joining line L, while the directions of the warp yarns of the woven cloths of the front and rear side sheet members 12A, 12B cross each other at the predetermined angle of 60 to 70 at the joining line L. The rear side sheet member 12B is formed at its central part with a central opening 16 serving as a gas inlet through which the gas from the gas generator 14 is supplied to the inside of the airbag 10.

Figure 3:
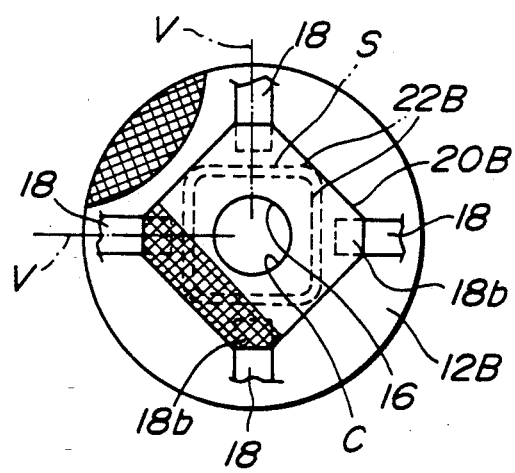
FIG. 3 is an inside rear view, partly broken away, of the airbag of FIG. 1.
Figure 4:
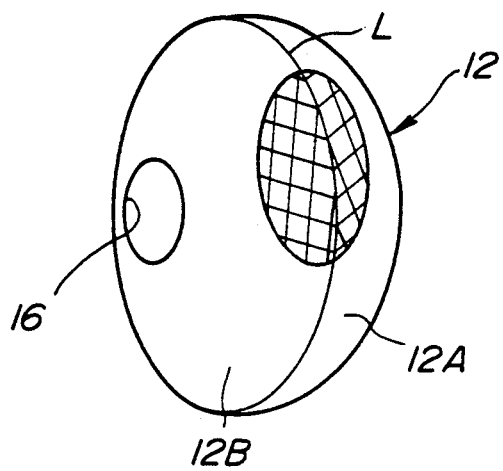
FIG. 4 is a perspective view, partly broken away, of a bag-shaped section of the airbag of FIG. 1.

Four suspension belts 18 are fixedly disposed inside the airbag 10 in order to prevent the airbag 10 from inflating in a generally one direction or toward the passenger under striking of a directional gas pressure (indicated by an arrow a in FIG. 1) of gas ejected from the gas generator 14 against the central part of the front side sheet member 12A of the airbag 10. A front end section 18a of each suspension belt 18 is sewed to the peripheral portion of a front belt catch (sheet) member 20A. A rear end section 18b of each suspension belt 18 is sewed to the peripheral portion of a generally square rear belt catch (sheet) member 20B. Each of the front and rear belt catch members 20A, 20B includes a woven cloth or the like coated with a flame-resistant synthetic resin layer. The front belt catch member 20A is sewed to the central part of the front side sheet member 12A, forming a sewed section 22A. The rear belt catch member 20B is sewed to the central part or the inner peripheral portion of the rear side sheet member 12B which inner peripheral portion defines thereinside the central opening 16, forming a sewed section 22B. The rear belt catch member 20B is formed at its central part with a central opening C which is concentrical with the central opening 16 of the rear side sheet member 12B upon being sewed to the rear side sheet member 12B as shown in FIG. 3. Each of the front and rear belt catch members 20A, 20B may be replaced with two identical belt catch members, in which each of the front and rear end sections 18a, 18b of the suspension belt 18 is put between and sewed to the two same belt catch members, though not shown.

The inner peripheral portion of the rear side sheet member 12B is fixedly secured to a base member 19 which is fixed to a stationary member such as an instrument panel or a steering wheel of the vehicle, though not shown. More specifically, the inner peripheral portion of the rear side sheet member 12B is put together with the rear belt catch member 20B between the base plate 19 and a retainer 21 and fixed in position by means of pins (no numerals) for connecting the base plate 19 and the retainer 21. The pins pass through the rear belt catch member 20B and the inner peripheral portion of the rear side sheet member 12B.

Figure 2:
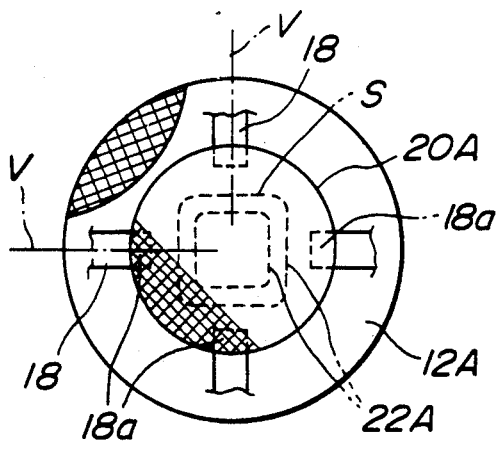
FIG. 2 is an inside front view, partly broken away, of an airbag of FIG. 1.

As shown in FIGS. 1 and 2, each sewed section 22A, 22B of the belt catch member 20A, 20B with the sheet member 12A, 12B is formed to extend generally linearly and rectangularly. In this embodiment, the sewed section 22 includes two sewing lines. The corners of the rectangularly extending sewed section 22A, 22B are rounded. The linearly extending sewed section 22A, 22B has four straightly extending portions S. The length of the straightly extending portion S is larger than the width of the end section 18a, 18b of the suspension belt 18. It is to be noted that each end section 18a, 18b of each suspension belt 18 is generally perpendicular to the straightly extending portion 22a. In other words, more specifically, the straightly extending portion S of the sewed section 22A, 22B is perpendicular to an imaginary vertical plane V containing a longitudinal axis of at least the end section 18a, 18b of the suspension belt 18.

In this embodiment, the front end section 18a of each suspension belt 18 is sewed to the front belt catch member 20A in a manner that the lengthwise direction of the front end section 18a (or of the whole suspension belt 18) and the direction of a (vertical) grain of the woven cloth of the front belt catch member 20A cross each other at a predetermined angle ranging from 40° to 60°. It will be understood that the lengthwise direction of the front end section 18a and the direction of the other (horizontal) grain of the woven cloth of the front belt catch member 20A cross each other at a predetermined angle ranging from 30° to 50°. Thus, sewing the front end section 18a of each suspension 18 to the front belt catch member 20A is made in a so-called bias state. Similarly, the rear end section 18b of each suspension belt 18 is sewed to the rear belt catch member 20B in a manner that the lengthwise direction of the rear end section 18b (or of the whole suspension belt 18) and the direction of a (vertical) grain of the woven cloth of the rear belt catch member 20B cross each other at the predetermined angle of 40° to 60°. It will be understood that the lengthwise direction of the rear end section 18b and the direction of the other (horizontal) grain of the woven cloth of the rear belt catch member 20B cross each other at a predetermined angle ranging from 30° to 50°. Thus, sewing the rear end section 18b of each belt catch member 18 to the rear belt catch member 20B is made in the bias state.

As shown in FIGS. 2 and 3, the lengthwise direction of the front end section 18a (or of the whole suspension belt 18) crosses the direction of a (horizontal) grain of the woven cloth of the front side sheet member 12A at a predetermined angle ranging from 60° to 70°, and crosses the direction of the other (vertical) grain of the woven cloth of the front side sheet member 12A at a predetermined angle ranging from 20° to 30°. Thus, the front end section 18a of each suspension member 18 is in the bias state relative to the front side sheet member 12A. Similarly, the lengthwise direction of the rear end section 18b (or of the whole suspension belt 18) crosses the direction of a (horizontal) grain of the woven cloth of the rear sheet member 12B at the predetermined angle ranging from 60° to 70°, and crosses the direction of the other (vertical) grain of the woven cloth of the rear sheet member 12B at the predetermined angle ranging from 20° to 30°. Thus, the rear end section 18b of each suspension belt 18 is in the bias state relative to the rear side sheet member 12B.

Additionally, the straightly extending portion S of the sewed section 22A for the front belt catch member 20A crosses the direction of a (horizontal) grain of the woven cloth of the front side sheet member 12A at a predetermined angle ranging from 20° to 30°. It will be understood that the straightly extending portion S of the sewed section 22A crosses the direction of the other (vertical) grain of the woven cloth of the front side sheet member 12A at a predetermined angle ranging from 60° to 70°. In other words, the straightly extending portion S and the front side sheet member 12A are in the bias state. Similarly, the straightly extending portion S of the sewed section 22B for the rear belt catch member 20B crosses the direction of a (horizontal) grain of the woven cloth of the rear side sheet member 12B at the predetermined angle of 20° to 30°. It will be understood that the straightly extending portion S of the sewed section 22B crosses the other (vertical) grain of the woven cloth of the rear side sheet member 12B at the predetermined angle ranging from 60° to 70°. Thus, the straightly extending portion S and the rear side sheet member 12B are in the bias state.

With the thus arranged airbag 10, when the airbag 10 momentarily inflates upon being supplied with gas from the gas generator 14 at a predetermined condition in the vehicle serious collision, a high tension or impact load is applied to each of the suspension belts 18 and then transmitted through the belt catch members 20A, 20B to the front and rear side sheet members 12A, 12B. At this time, since the end sections 18a, 18b of each suspension belt are secured through the front and rear belt catch members 20A, 20B to the front and rear side sheet members 12A, 12B, respectively, in the bias state, the front and rear side sheet members 12A, 12B are prevented from tearing along the sewed sections 22A, 22B, thereby improving a pressure proof strength of the front and rear side sheet members 12A, 12B. Such an advantageous effect can be further improved by such an arrangement that the straightly extending portion S of each sewed section 22A, 22B and the direction of the woven cloth grains of each of the front and rear side sheet members 12A, 12B are in the bias state.

Furthermore, the tension applied to each suspension belt 18 is transmitted and distributed uniformly throughout the length of each of the straightly extending portions S of the sewed sections 22A, 22B without concentrating to a local point of each sewed section 22A, 22B. This effectively prevents sewing threads of the sewed section 22A, 22B from being broken, thereby protecting the belt catch members 20A, 20B from getting off from the respective front and rear side sheet members 12A, 12B. As a result, the possibility of striking of the airbag against the passenger is avoided, thus providing an airbag restraint system excellent in safety.

Figure 5:
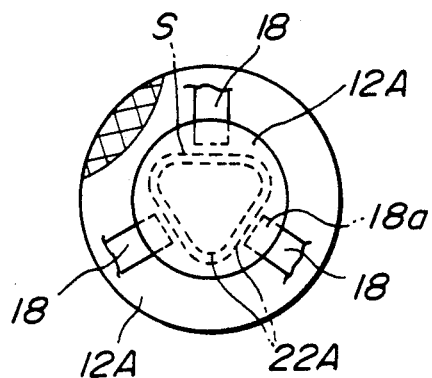
FIG. 5 is an inside front view, partly broken away, of another example of an airbag of the airbag restraint system in accordance with the present invention.
Figure 6:
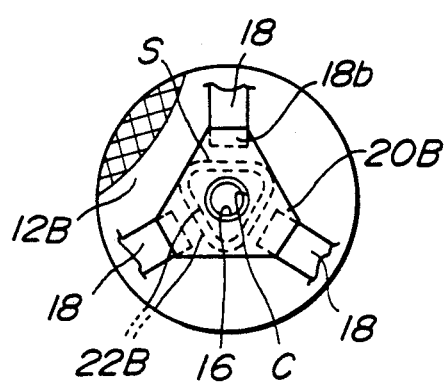
FIG. 6 is an inside rear view, partly broken away, of the airbag of FIG. 5.
Figure 7:
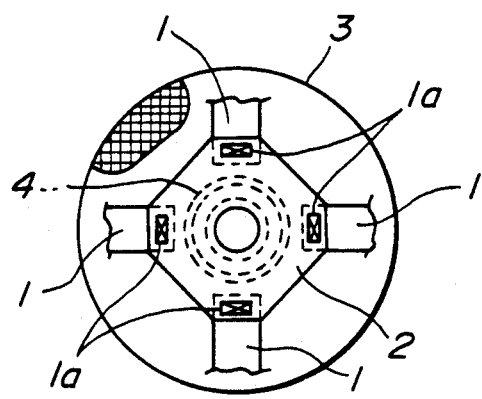
FIG. 7 is an inside rear side view, partly broken away, of an airbag of a conventional airbag restraint system.

FIGS. 5 and 6 illustrate another example of the airbag 10 of the airbag restraint system according to the present invention, which is similar to that of FIGS. 1 to 4 with the exception that three suspension belts 18 are used in place of the four suspension belts 18. In this embodiment, the rear belt catch member 20B is generally triangular. Each sewed section 22A, 22B is formed to extend linearly and triangularly. The lengthwise direction of the end section 18a, 18b of each suspension belt 18 is perpendicular to the straightly extending portion S of the sewed section 22A, 22B. The lengthwise direction of the end section 18a, 18b of each suspension belt 18 crosses the directions of the grains of the woven cloth of the belt catch member 20A, 20B at the predetermined angles. Therefore, each suspension belt 18 and the belt catch member 20A, 20B are in the bias state. The lengthwise direction of the end section 18a, 18b of each suspension member 18 crosses the directions of the woven cloth grains of the front and rear side sheet members 12A, 12B at the predetermined angles. Therefore, each suspension belt 18 and the sheet member 12A, 12B are in the bias state. Additionally, the straightly extending portion S of the sewed section 22A, 22B crosses the direction of the grain of the sheet member 12A, 12B at the predetermined angle. Therefore, the straightly extending portion S of the sewed section 22A, 22B are secured in the bias state.

While only two embodiments have been shown and described as having four and three suspension belts, it will be understood that other number of suspension belts may be used, in which a variety of shapes of the belt catch members (20A, 20B) and sewed sections (22A, 22B) are employed.

What is claimed is:
1. An airbag restraint system comprising:
   an airbag fluidly connected with a gas generator and adapted to be supplied with gas from the gas generator, said airbag including
   a bag-shaped section including a first sheet member formed with a central opening through which gas is supplied into said bag-shaped section from the gas generator, and a second sheet member joined with said first sheet member at an outer peripheral portion; each of said first and second sheet members including a woven cloth;
   first and second belt catch members which are sewed respectively to said first and second sheet members at their inner surfaces;

a plurality of suspension belts disposed inside said bag-shaped section, each suspension belt having first and second end sections which are sewed respectively to said first and second belt catch members, a lengthwise direction of each suspension belt crossing each of the directions of grains of the woven cloth of said first and second sheet members at a predetermined angle except for about 90°; and means defining at least one of a first sewed section through which said first belt catch member is sewed to said first sheet member at the inner surface, said first sewed section extending linearly and including a straightly extending portion which is generally perpendicular to the lengthwise direction of each suspension belt.

2. An airbag restraint system comprising:

an airbag fluidly connected with a gas generator and adapted to be supplied with gas from the gas generator, said airbag including a bag-shaped section including a first sheet member formed with a central opening through which gas is supplied into said bag-shaped section from the gas generator, and a second sheet member joined with said first sheet member at an outer peripheral portion to define a joining line between said first and second sheet members, each of said first and second sheet members including a woven cloth, directions of grains of the woven cloths of said first and second sheet members crossing each other at a first predetermined angle except for about 90° at said joining line;

first and second belt catch members which are sewed respectively to said first and second sheet members at their inner surface;

a plurality of suspension belts disposed inside said bag-shaped section, each suspension belt having first and second end sections which are sewed respectively to said first and second belt catch members, a lengthwise direction of each suspension belt crossing each of the directions of the woven cloth grains of said first and second sheet members at a second predetermined angle except for about 90°; and means defining at least one of a first sewed section through which said first belt catch member is sewed to said first sheet member at the inner surface, said first sewed section extending linearly and including a straightly extending portion which is generally perpendicular to the lengthwise direction of each suspension belt.

3. An airbag restraint system as claimed in claim 1, further comprising means defining a second sewed section through which said second belt catch member is sewed to said second sheet member at the inner surface, said second sewed section extending linearly and including a straightly extending portion which is generally perpendicular to the lengthwise direction of each suspension belt.

4. An airbag restraint system as claimed in claim 1, wherein said straightly extending portion of said first sewed section crosses a direction of a predetermined grain of the woven cloth of said first sheet member at a second predetermined angle except for about 90°.

5. An airbag restraint system as claimed in claim 3, wherein said straightly extending portion of said second sewed section crosses a direction of a predetermined grain of the woven cloth of said second sheet member at a second predetermined angle except for about 90°.

6. An airbag restraint system as claimed in claim 2, wherein said first belt catch member includes a woven cloth, in which the lengthwise direction of each suspension belt crosses a direction of a predetermined grain of the woven cloth of said first belt catch member at a third predetermined angle except for about 90°.

7. An airbag restraint system as claimed in claim 2, wherein said second belt catch member includes a woven cloth, in which the lengthwise direction of each suspension belt crosses a direction of a predetermined grain of the woven cloth of said second belt catch member at a third predetermined angle except for about 90°.

8. An airbag restraint system as claimed in claim 2, wherein directions of corresponding predetermined grains of the cloths of said first and second sheet members cross each other at said first predetermined angle at said joining line, said first predetermined angle being within a range from 20° to 30°.

9. An airbag restraint system as claimed in claim 2, wherein the lengthwise direction of each suspension belt crosses a direction of a predetermined grain of the woven cloth of each of first and second sheet member at said second predetermined angle which is within a range from 60° to 70°.

10. An airbag restraint system as claimed in claim 4, wherein said second predetermined angle is within a range from 20° to 30°.

11. An airbag restraint system as claimed in claim 5, wherein said second predetermined angle is within a range from 20° to 30°.

12. An airbag restraint system as claimed in claim 6, wherein said third predetermined angle is within a range from 40° to 60°.

13. An airbag restraint system as claimed in claim 7, wherein said third predetermined angle is within a range from 40° to 60°.

14. An airbag restraint system as claimed in claim 2, wherein a direction of the longitudinal axis of each suspension belt crosses a direction of the longitudinal axis of each woven cloth grain of each of said first and second sheet members at said second predetermined angle.

15. An airbag restraint system as claimed in claim 2, wherein a direction of a longitudinal axis of an end section of each suspension belt crosses a direction of a longitudinal axis of each woven cloth grain of each of said first and second sheet members at said second predetermined angle, said end section being sewed to each of said first and second belt catch members.

16. An airbag restraint system as claimed in claim 3, wherein said straightly extending portion of each of said first and second sewed sections has a length larger than a width of an end section of each suspension belt, said end section being sewed to each of said first and second belt catch members.

17. An airbag restraint system as claimed in claim 2, wherein said first sheet member is generally annular, and said second sheet member is generally circular, in which said first and second sheet members are sewed at their peripheral portions with each other to form said bag-shaped section.

18. An airbag restraint system as claimed in claim 17, further comprising a base member to be fixed to a stationary member of a vehicle, in which the inner peripheral portion of said second sheet member is secured to said base member.

19. An airbag restraint system as claimed in claim 18, wherein the gas generator ejects gas so that the gas strikes against the inner surface of said second sheet member.

* * * * *